Oct. 20, 1942. A. R. GOLDSBY Re. 22,205
MANUFACTURE OF HIGH ANTIKNOCK HYDROCARBONS
Original Filed July 8, 1939
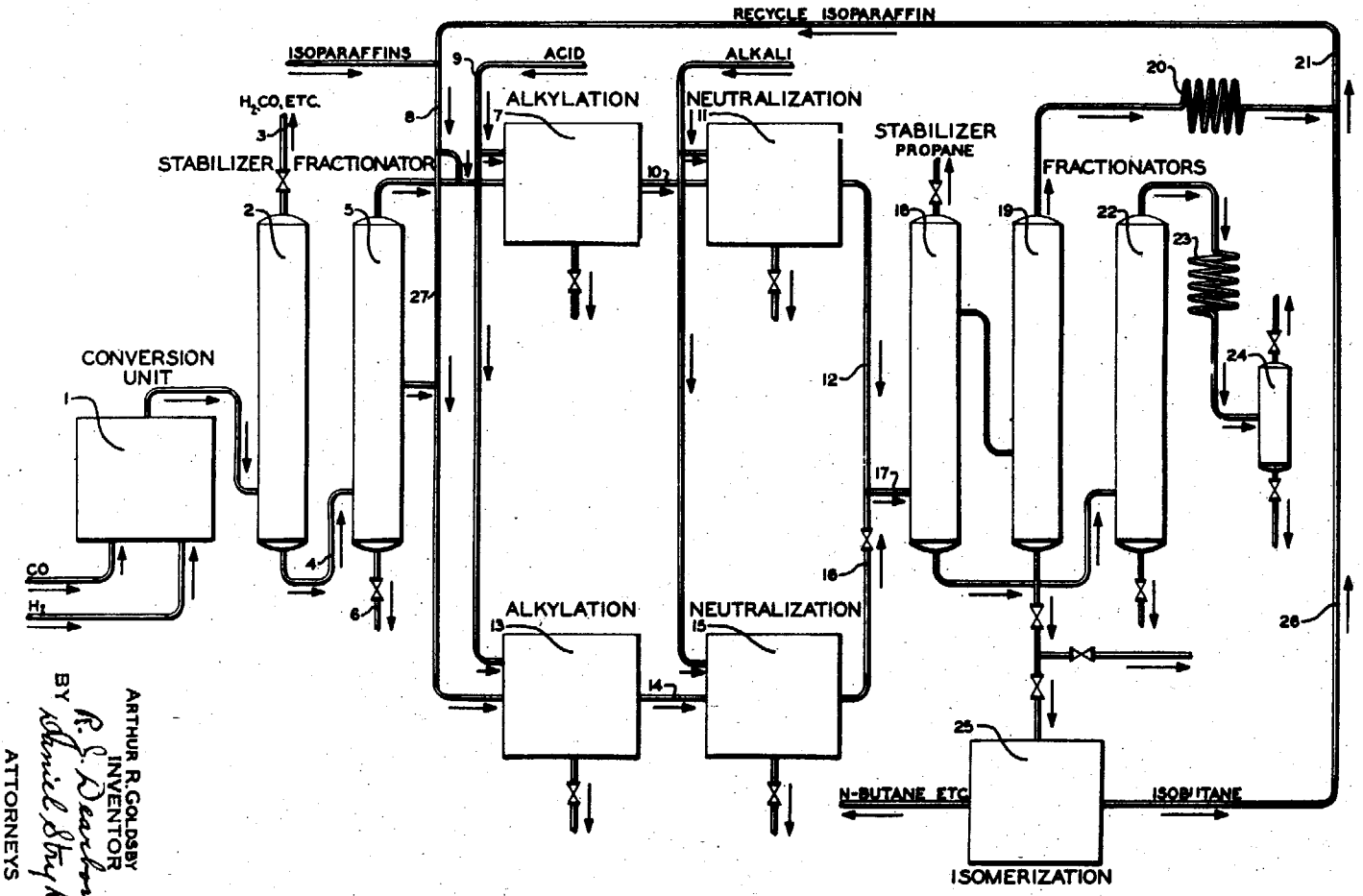
ARTHUR R. GOLDSBY
INVENTOR
BY R. S. Dearborn
Daniel Stryker
ATTORNEYS Reissued Oct. 20, 1942

Re. 22,205

UNITED STATES PATENT OFFICE 22,205

MANUFACTURE OF HIGH ANTIKNOCK HYDROCARBONS

Arthur R. Goldsby, Beacon, N. Y., assignor to The Texas Company, a corporation of Delaware Original No. 2,257,074, dated September 23, 1941, Serial No. 283,429, July 8, 1939. Application for reissue April 14, 1942, Serial No. 438,928

5 Claims. (Cl. 196—10)

This invention relates to a process for manufacturing hydrocarbons, such as high anti-knock hydrocarbons suitable for motor fuel.

The invention broadly contemplates catalytically converting a mixture of carbon monoxide and hydrogen to hydrocarbons and alkylating the resulting hydrocarbons, or constituents thereof, with isoparaffin hydrocarbons in the presence of an alkylation catalyst, such as concentrated sulphuric acid.

It has been known heretofore to produce low-boiling hydrocarbons for use in the manufacture of motor fuel by the catalytic conversion of a gaseous mixture of carbon monoxide and hydrogen. The gasoline fraction from the product of conversion contains a large proportion of unsaturated hydrocarbons and is also characterized by having a low octane number (C. F. R. M.) of around 40.

It has been found that a synthetic hydrocarbon mixture prepared by the conversion of carbon monoxide and hydrogen, such as in a Fischer-Tropsch process, is particularly suitable for alkylation with isoparaffin hydrocarbons, such as isobutane, to produce a saturated motor fuel which is gum and color-stable, has a high lead susceptibility and may be of higher anti-knock value. By "high lead susceptibility" it is meant that the alkylated hydrocarbon mixture is highly susceptible to increase in anti-knock value by incorporating therein lead tetraethyl.

In accordance with the present invention a low-boiling hydrocarbon mixture is produced, by the catalytic conversion of carbon monoxide and hydrogen, which contains a relatively high content of normal olefins as the olefinic constituent thereof, particularly a relatively high content of normal butylenes and a relatively low content of isobutylene as the $C_4$ olefinic constituents thereof. In addition, the synthetic hydrocarbon mixture is substantially free from aromatic constituents and comparatively free from naphthenic constituents.

An olefin containing hydrocarbon mixture which is low in isobutylene content is of particular advantage in the alkylation reaction, since otherwise the presence of substantial amounts of isobutylene increases the consumption of catalytic acid and tends to reduce the yield of alkylate of high octane value. Likewise, substantial freedom from aromatic and naphthenic constituents renders the mixture more susceptible to alkylation with a catalyst such as sulphuric acid.

The invention will now be described in more detail by reference to the accompanying drawing comprising a flow diagram illustrating a method of carrying out the process of this invention.

Carbon monoxide and hydrogen or a gaseous mixture thereof in suitable proportions is passed to a catalytic converter 1 wherein the gaseous mixture is brought into contact with a conversion catalyst to effect conversion into hydrocarbons having a substantial olefin content. The catalyst may comprise metals such as cobalt, nickel, iron, manganese or the oxides thereof, with or without a promoter such as thorium oxide. The catalyst is advantageously supported upon a material such as diatomaceous earth. Nickel, for example, is a preferred catalyst from the standpoint of increasing the olefin production relative to the production of saturated hydrocarbons.

The carbon monoxide and hydrogen may be charged to the converter in the ratio of around 1 mol of carbon monoxide to about 2 mols of hydrogen. By decreasing somewhat the ratio of hydrogen to carbon monoxide it is possible to increase the yield of olefins produced.

The temperature maintained within the converter may range from around 330 to 400° F. and the reaction may be carried out under a pressure of about atmospheric, although somewhat higher pressures may be employed up to about ten atmospheres, for example.

Instead of a single converter the reaction may be carried out in stages, using two or more converters in series. The products of conversion comprise normally gaseous and normally liquid hydrocarbons composed of around 60 to 70% by weight of hydrocarbons containing from one to about ten carbon atoms, with the remainder comprising higher boiling hydrocarbons.

The hydrocarbon products of reaction, including unreacted carbon monoxide and hydrogen, are passed to a stabilizer 2 wherein the unreacted materials, hydrogen and carbon monoxide, are removed in the form of a gas through a valved pipe 3 and may be recycled ultimately to the converter 1. In cases where there is an appreciable quantity of methane, ethane and ethylene present it is desirable to remove these $C_1$ and $C_2$ hydrocarbons from the conversion products.

The liquid accumulating in the bottom of the stabilizer 2 comprises the synthetic hydrocarbon mixture and is continuously drawn off through a conduit 4 and passed to a fractionator 5.

In the fractionator 5 the synthetic hydrocarbon mixture is separated into a normally gaseous hydrocarbon fraction, which is removed in vapor form from the top of the fractionator. A side stream is removed from the fractionator 5 and which comprises normally liquid gasoline hydrocarbons; that is hydrocarbons boiling up to about 392° F.

The higher boiling constituents accumulate in the bottom of the fractionator 5 and are continuously withdrawn through a valve pipe 6.

The gaseous hydrocarbon fraction removed from the top of the fractionator may amount to 8 or 10% of the synthetic hydrocarbon mixture charged to the fractionator. It will comprise hydrocarbons such as propane, butane, propylene and butylene, and the olefin content may be around 50 to 55% by volume.

The liquid gasoline fraction drawn off as a side stream may amount to around 60% of the synthetic hydrocarbon charge and may contain around 30 to 35% of olefins.

The gaseous fraction is passed to an alkylation unit 7 wherein it is treated with isobutane in the presence of concentrated sulphuric acid. Thus, fresh isoparaffin may be introduced to the alkylation unit from a pipe 8, while acid is introduced from a pipe 9. The mixture is subjected to reaction within the unit whereby the olefin hydrocarbons are alkylated with the isoparaffins.

The used or spent acid is drawn off, while the alkylate is drawn off through a conduit 10 to a neutralizer 11. In the neutralizer 11 the alkylate is treated with alkali to neutralize it. The alkali sludge is drawn off while the neutralized alkylate is separately passed through a conduit 12.

Likewise, the liquid gasoline hydrocarbon fraction produced as a side stream from the fractionator 5 is passed to an alkylation unit 13 wherein it is treated with isoparaffin in the presence of the alkylation catalyst.

The resulting alkylate is drawn off through a conduit 14 to a neutralizer 15 wherein it is neutralized with alkali. The neutralized alkylate from 15 is drawn off through a conduit 16. While separate alkylation systems are disclosed for the normally gaseous and the normally liquid conversion products respectively, it is to be understood that the entire conversion product or a fraction thereof cut below about 400° F. and containing both normally gaseous and liquid products may be alkylated in a single alkylation system.

Both conduits 12 and 16 communicate with a conduit 17 leading to a stabilizer 18 wherein a gaseous fraction comprising propane may be removed. A fraction comprising normal butane and unreacted isobutane may be removed as a side stream. A portion of the normal butane may be left in the alkylate or subsequently returned thereto in order to adjust the lower end of the distillation range of this product.

The side stream from the stabilizer 18 is introduced to a fractionator 19 wherein the isobutane is separated from the normal butane and other hydrocarbons which may be present.

The isobutane separated in fractionator 19 is passed through a cooling and condensing coil 20 to a conduit 21, communicating with pipe 8 previously referred to. In this way the unreacted isobutane is recycled to the reaction zone for further reaction with olefin hydrocarbons. Through a bypass 27 the isobutane may be conducted to the alkylation unit 13.

The liquid alkylate from the bottom of the stabilizer 18 is passed to a fractionator 22, wherein it may be subjected to fractionation to produce a product of the desired distillation range and suitable as a motor fuel. This may be an aviation gasoline having an end boiling point of about 311° F., or a conventional motor fuel having about a 400° F. end point, or may even include higher boiling materials within the kerosene boiling range and suitable for use as a safety motor fuel. The motor fuel product is removed from the top of the fractionator 22 as a vapor and passed through a cooling and condensing coil 23. The resulting condensate is accumulated in a receiver 24.

The higher boiling constitutents are withdrawn in liquid form from the bottom of the fractionator 22 for such disposition as may be desired.

That portion of the normal butane drawn off from the bottom of the fractionator 19 and not disposed of as such may be conducted to an isomerization plant 25. In the plant 25 it is brought into contact with a suitable isomerization catalyst, such as aluminum chloride, under conditions of temperature and pressure adapted to convert normal butane to isobutane. For example, the normal butane may be subjected to contact with anhydrous aluminum chloride in the presence of a small amount of hydrogen halide in the vapor phase at temperatures of about 190 to 220° F. and pressures of about 175 to 250 pounds per square inch. The off-gases from this reaction may be either recycled in toto, with washing to remove hydrogen halide, or subjected to fractionation.

The isobutane produced in this way is passed through a pipe 26, communicating with pipe 21 previously referred to, which in turn communicates with pipes 8 and 27 previously referred to.

While alkylation of the synthetic hydrocarbons with isobutane has been specifically mentioned in connection with the foregoing description, it is contemplated that other isoparaffin hydrocarbons may be used or paraffinic hydrocarbon fractions containing isoparaffins. Where it is desired to produce an alkylate comprising mainly constitutents boiling within the range of ordinary motor fuel, it is advantageous to use isobutane or a hydrocarbon fraction containing isobutane in large amount.

Where sulphuric acid is the alkylation catalyst it is desirable to use an acid having a concentration of around 90 to 100% and, preferably, about 94 to 98% $H_2SO_4$.

The temperature of the alkylation reaction may range from around 0 to 120° F., but advantageously is about 60 to 90° F.

Sufficient pressure is employed to maintain the reacting liquids in the liquid phase.

The ratio of isobutane to olefins in the charge entering the reactors 7 and 13 is at least about 1:1 and preferably about 3:1 to 5:1. The ratio of acid to total hydrocarbons in the reactor may be around 0.5 to 2.0 parts by volume of acid to one of hydrocarbon.

It is also contemplated that other alkylation catalysts besides sulphuric acid may be employed. For example, other catalysts may be aluminum chloride or a liquid prepared by completely saturating water at about room temperature with boron trifluoride.

Obviously many modifications and variations of the invention as hereinbefore set forth may be made without departing from the spirit and scope thereof, and therefore only such limitations should be imposed as are indicated in the appended claims.

I claim:

1. In a process for the manufacture of high anti-knock motor fuel hydrocarbons, the steps which comprise catalytically converting a mixture of carbon monoxide and hydrogen to a synthetic hydrocarbon mixture composed mainly of hydrocarbons having from one to about ten carbon atoms per molecule, said hydrocarbons being composed largely of normal olefins, including normal butylenes as the olefinic constituents thereof, and being comparatively free from aromatic and naphthenic constituents, separating from said synthetic mixture gasoline hydrocarbons boiling up to about 390° F. having a relatively high content of normal butylenes and a relatively low content of isobutylene as the $C_4$ olefinic constituents thereof, and reacting said gasoline hydrocarbons with a paraffin hydrocarbon fraction comprising isobutane in the presence of concentrated sulfuric acid and in the substantial absence of isobutylene and aromatic hydrocarbons whereby isobutane is alkylated to produce normally liquid saturated hydrocarbons having a high anti-knock value and boiling within the range for motor fuel.

2. The method according to claim 1 in which the conversion of carbon monoxide and hydrogen is effected at a temperature of around 330 to 400° F. under a pressure ranging from about one to ten atmospheres, and with a molal ratio of hydrogen to carbon monoxide of not greater than 2:1.

3. In a process for the manufacture of high anti-knock motor fuel hydrocarbons, the steps which comprise catalytically converting a mixture of carbon monoxide and hydrogen to a synthetic hydrocarbon mixture composed mainly of hydrocarbons having from one to about ten carbon atoms per molecule, said hydrocarbons being composed largely of normal olefins, including normal butylenes as the olefinic constituents thereof, and being comparatively free from aromatic and naphthenic constituents, separating from said synthetic mixture gasoline hydrocarbons boiling up to about 390° F. having a relatively high content of normal butylenes and a relatively low content of isobutylene as the $C_4$ olefinic constituents thereof, fractionating said separated gasoline hydrocarbons into a normally gaseous fraction containing around 50% and more of olefins by volume and a normally liquid fraction containing around 30% and more of olefins by volume, separately reacting each of said fractions with isobutane in the presence of concentrated sulfuric acid and in the substantial absence of isobutylene and aromatic hydrocarbons to produce saturated hydrocarbons of high anti-knock value and blending the resulting alkylated hydrocarbons to produce motor fuel.

4. In a process for the manufacture of high anti-knock motor fuel hydrocarbons, the steps which comprise catalytically converting carbon monoxide and hydrogen at a temperature of around 330 to 400° F. and under a pressure of around one to ten atmospheres so as to produce a synthetic hydrocarbon mixture composed mainly of hydrocarbons having around one to ten carbon atoms per molecule and comprising normally gaseous and normally liquid hydrocarbons, said normally gaseous hydrocarbons having an olefin content of around 50 to 55% by volume and composed largely of normal butylenes as the $C_4$ olefinic constituents thereof, separating said synthetic hydrocarbon mixture into normally gaseous and normally liquid hydrocarbon fractions, respectively, withdrawing the normally gaseous fraction, reacting said withdrawn fraction with isobutane in the presence of concentrated sulfuric acid and in the substantial absence of isobutylene and aromatic hydrocarbons whereby isobutane is alkylated to produce normally liquid saturated hydrocarbons of high anti-knock value and suitable for motor fuel.

5. In a process for the manufacture of high anti-knock motor fuel hydrocarbons, the steps which comprise catalytically converting carbon monoxide and hydrogen to a synthetic hydrocarbon mixture composed mainly of hydrocarbons having around one to ten carbon atoms per molecule and comprising normally gaseous and normally liquid hydrocarbons composed largely of normal olefins as the olefinic constituents thereof, separating from said hydrocarbon mixture a normally gaseous fraction boiling essentially above the $C_2$ hydrocarbon boiling range and composed largely of normal butylenes with not more than a relatively low content of isobutylene as the $C_4$ olefinic constituents thereof, and reacting said separated normally gaseous fraction with a low-boiling isoparaffin in the presence of strong sulfuric acid of alkylation strength and in the substantial absence of isobutylene and aromatic hydrocarbons, whereby isobutane is alkylated to produce normally liquid saturated hydrocarbons of high anti-knock value and suitable for motor fuel.

ARTHUR R. GOLDSBY.